(12) United States Patent
Kawazoe et al.

(10) Patent No.: US 8,493,498 B2
(45) Date of Patent: Jul. 23, 2013

(54) IMAGE APPARATUS SYSTEM, CAMERA BODY AND INTERCHANGEABLE LENS

(75) Inventors: Kenji Kawazoe, Hyogo (JP); Mitsuyoshi Okamoto, Osaka (JP); Koji Shibuno, Osaka (JP)

(73) Assignee: Panasonic Corporation, Osaka (JP)

( * ) Notice: Subject to any disclaimer, the term of this patent is extended or adjusted under 35 U.S.C. 154(b) by 356 days.

(21) Appl. No.: 12/992,380

(22) PCT Filed: May 14, 2009

(86) PCT No.: PCT/JP2009/002123
§ 371 (c)(1),
(2), (4) Date: Nov. 12, 2010

(87) PCT Pub. No.: WO2009/139173
PCT Pub. Date: Nov. 19, 2009

(65) Prior Publication Data
US 2011/0063497 A1    Mar. 17, 2011

Related U.S. Application Data

(60) Provisional application No. 61/053,815, filed on May 16, 2008.

(30) Foreign Application Priority Data

Jun. 27, 2008   (JP) .................................. 2008-168358

(51) Int. Cl.
*H04N 5/225*    (2006.01)
(52) U.S. Cl.
USPC .......................................... 348/360; 396/532
(58) Field of Classification Search
USPC . 348/207.99, 345–357, 360, 373; 396/79–83, 396/89–152, 532
See application file for complete search history.

(56) References Cited

U.S. PATENT DOCUMENTS

| 4,783,677 A | 11/1988 | Hamada et al. |
| 5,387,960 A | 2/1995 | Hirasawa et al. |

(Continued)

FOREIGN PATENT DOCUMENTS

| EP | 0 425 243 | 5/1991 |
| JP | 3-137608 | 6/1991 |

(Continued)

OTHER PUBLICATIONS

Notification of Transmittal of Translation of the International Preliminary Report on Patentability (PCT/IB/338) mailed on Jan. 20, 2011 with PCT/IB/373 & PCT/ISA/237 for corresponding application PCT/JP2009/002123.

(Continued)

*Primary Examiner* — Nelson D. Hernández Hernández
*Assistant Examiner* — Dennis Hogue
(74) *Attorney, Agent, or Firm* — Panasonic Patent Center (57) ABSTRACT

An imaging apparatus system includes an interchangeable lens 100 and a camera body 200. The interchangeable lens 100 includes an optical system configured to generate an optical image of a subject, a first communication unit 106, and a lens controller 105 configured to control driving of the optical system in synchronization with a reference signal received through the first communication unit. The camera body 200 includes a second communication unit 201 that can communicate with the first communication unit 106, and a body controller 203 configured to send the reference signal to the lens controller 105 through the second communication unit 201. The body controller 203 sends announcement information preliminarily announcing switching of the cycle of the reference signal, to the lens controller 105. The lens controller 105, when receiving the announcement information from the camera body, performs a preparation operation for switching the cycle of the reference signal.

18 Claims, 6 Drawing Sheets

U.S. PATENT DOCUMENTS

| | | | |
|---|---|---|---|
| 5,648,836 | A | 7/1997 | Sato et al. |
| 6,094,223 | A | 7/2000 | Kobayashi |
| 6,320,613 | B1 | 11/2001 | Shiomi |
| 6,363,220 | B1 | 3/2002 | Ide |
| 2002/0044206 | A1 | 4/2002 | Kyuma et al. |
| 2002/0047912 | A1* | 4/2002 | Mabuchi et al. ............... 348/345 |
| 2002/0075395 | A1 | 6/2002 | Ohkawara |
| 2007/0086778 | A1 | 4/2007 | Tanaka |
| 2007/0140681 | A1 | 6/2007 | Tanaka |
| 2008/0031611 | A1 | 2/2008 | Konishi |
| 2008/0199170 | A1 | 8/2008 | Shibuno et al. |
| 2009/0251548 | A1 | 10/2009 | Honjo et al. |
| 2011/0044682 | A1 | 2/2011 | Kawanami |

FOREIGN PATENT DOCUMENTS

| | | |
|---|---|---|
| JP | 5-236326 | 9/1993 |
| JP | 8-6086 | 1/1996 |
| JP | 8-129199 | 5/1996 |
| JP | 08129199 A * | 5/1996 |
| JP | 10-161221 | 6/1998 |
| JP | 2000-32305 | 1/2000 |
| JP | 2006-208897 | 8/2006 |
| JP | 2006-211239 | 8/2006 |
| JP | 2008-72395 | 3/2008 |
| WO | 2007/055281 | 5/2007 |

OTHER PUBLICATIONS

The Extended European Search Report, Application No. EP 09 74 6393, dated on Oct. 7, 2011.

International Search Report of PCT Application No. PCT/JP2009/002123 dated Jun. 16, 2009.

* cited by examiner

IMAGE APPARATUS SYSTEM, CAMERA BODY AND INTERCHANGEABLE LENS

TECHNICAL FIELD

Technical Field relates to an imaging system configured by an interchangeable lens and a camera body, as well as a camera body and an interchangeable lens that can be used in an imaging system.

BACKGROUND ART

Patent Document 1 discloses an imaging apparatus system configured by an interchangeable lens and a camera body. In the imaging apparatus system, the interchangeable lens includes a focus lens drive motor and a zoom lens drive motor. Control of these motors, and so on, is performed in synchronization with a vertical synchronizing signal for video supplied from the camera body.

PRIOR ART DOCUMENTS

Patent Documents

Patent Document 1: JP03-137608A

DISCLOSURE OF INVENTION

Problems to be Solved by the Invention

In an imaging apparatus system, there is a demand for enabling to capture a variety of video by, for example, switching a video frame cycle. Switching of the frame cycle refers to changing the cycle of a vertical synchronizing signal and further refers to, in the imaging apparatus system described in Patent Document 1, changing the cycle of a reference signal which serves as a reference for control of the interchangeable lens.

Meanwhile, driving of a focus lens or zoom lens of the interchangeable lens requires time according to a lens position before the driving, motor performance, and so on. Therefore, if, for example, the cycle of the reference signal is suddenly changed by the camera body while controlling the driving of these lenses, an interruption of drive control to the lens, and so on, may occur. That is, trouble may occur in the control of the interchangeable lens.

An object of the present invention is to provide an imaging apparatus system, a camera body, and an interchangeable lens that can prevent trouble in the control of the interchangeable lens associated with a change in the cycle of a reference signal in an imaging system configured by an interchangeable lens and a camera body.

Means for Solving the Problems

In a first aspect, there is provided an imaging system including an interchangeable lens and a camera body. The interchangeable lens includes an optical system configured to generate an optical image of a subject, a first communication unit, and a lens controller configured to control driving of the optical system in synchronization with a reference signal received through the first communication unit. The camera body includes a second communication unit that can communicate with the first communication unit and a body controller configured to send the reference signal to the lens controller through the second communication unit and the first communication unit. The body controller, before switching a cycle of the reference signal to another, sends announcement information preliminarily announcing switching of the cycle of the reference signal to another, to the lens controller through the second communication unit and the first communication unit. The lens controller, when receiving the announcement information, performs a preparation operation for switching the cycle of the reference signal.

In a second aspect, there is provided a camera body which can be mounted with an interchangeable lens having an optical system and a lens controller configured to control driving of the optical system in synchronization with a received reference signal. The camera body includes a communication unit and a body controller configured to send the reference signal to the interchangeable lens through the communication unit. The body controller sends information preliminarily announcing switching of a cycle of the reference signal to another, to the interchangeable lens through the communication unit.

In a third aspect, there is provided an interchangeable lens mountable to a camera body. The interchangeable lens includes an optical system configured to generate an optical image of a subject, a communication unit, and a lens controller configured to control driving of the optical system in synchronization with a reference signal received from the camera body through the communication unit. The lens controller, when receiving information preliminarily announcing switching of a cycle of the reference signal to another, from the camera body through the communication unit, the lens controller performs preparation for switching the cycle of the reference signal to another.

Effect of the Invention

According to the above aspects, upon switching the cycle of a reference signal to another, information announcing switching of the cycle of the reference signal to another is sent to an interchangeable lens from a camera body. When the interchangeable lens receives the information announcing switching of the cycle of the reference signal to another, the interchangeable lens performs preparation for switching the cycle of the reference signal to another. Hence, the cycle of the reference signal is prevented from being suddenly switched to another while the interchangeable lens is driving an optical system, for example, and preparation for switching the cycle of the reference signal to another is favorably performed. Accordingly, trouble in the control of the interchangeable lens associated with a change in the cycle of the reference signal can be prevented.

MODE FOR CARRYING OUT THE INVENTION

First Embodiment

1. Configuration

Figure 1:
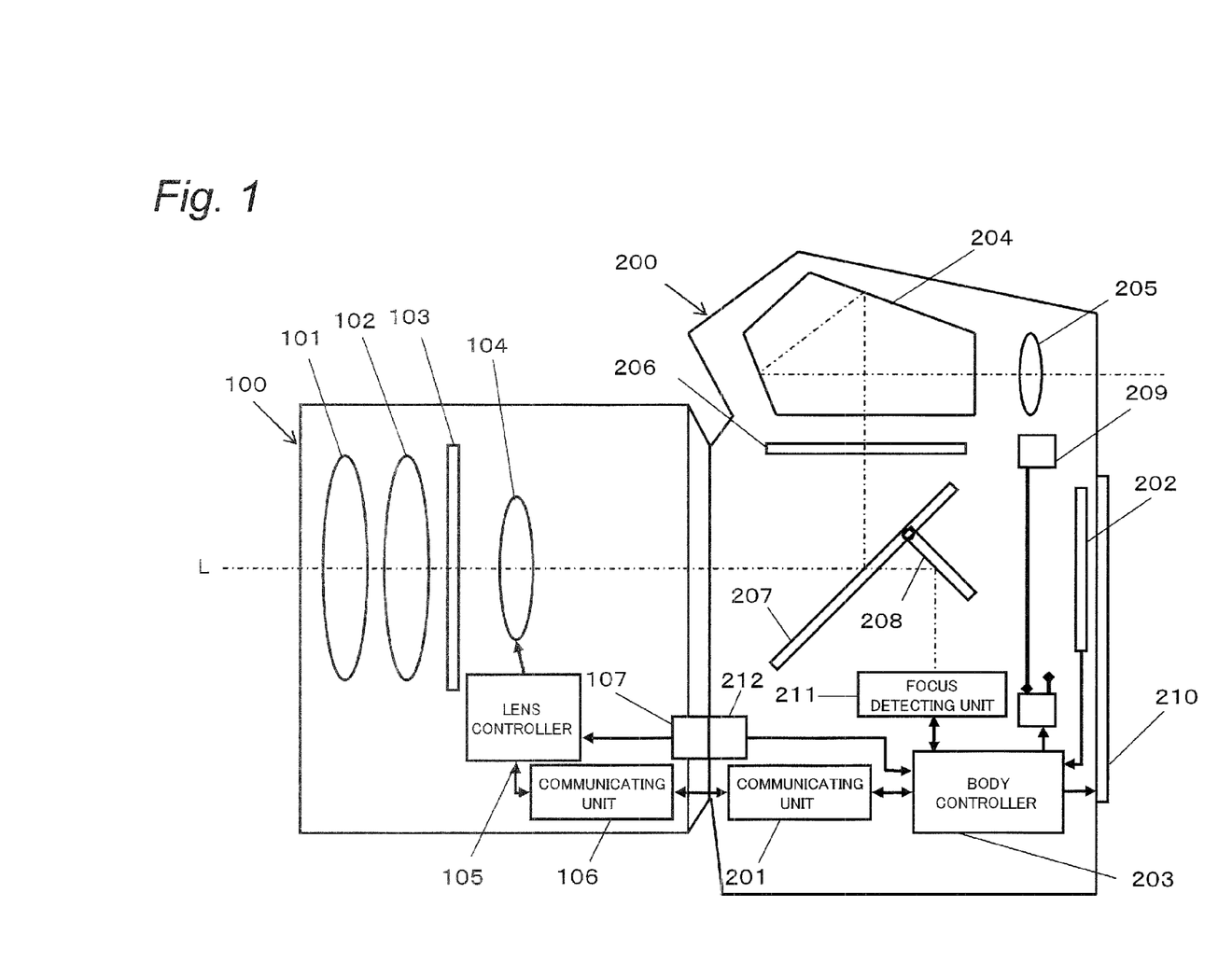
FIG. 1 is a configuration diagram of an imaging apparatus system in embodiments in a finder view mode.
Figure 2:
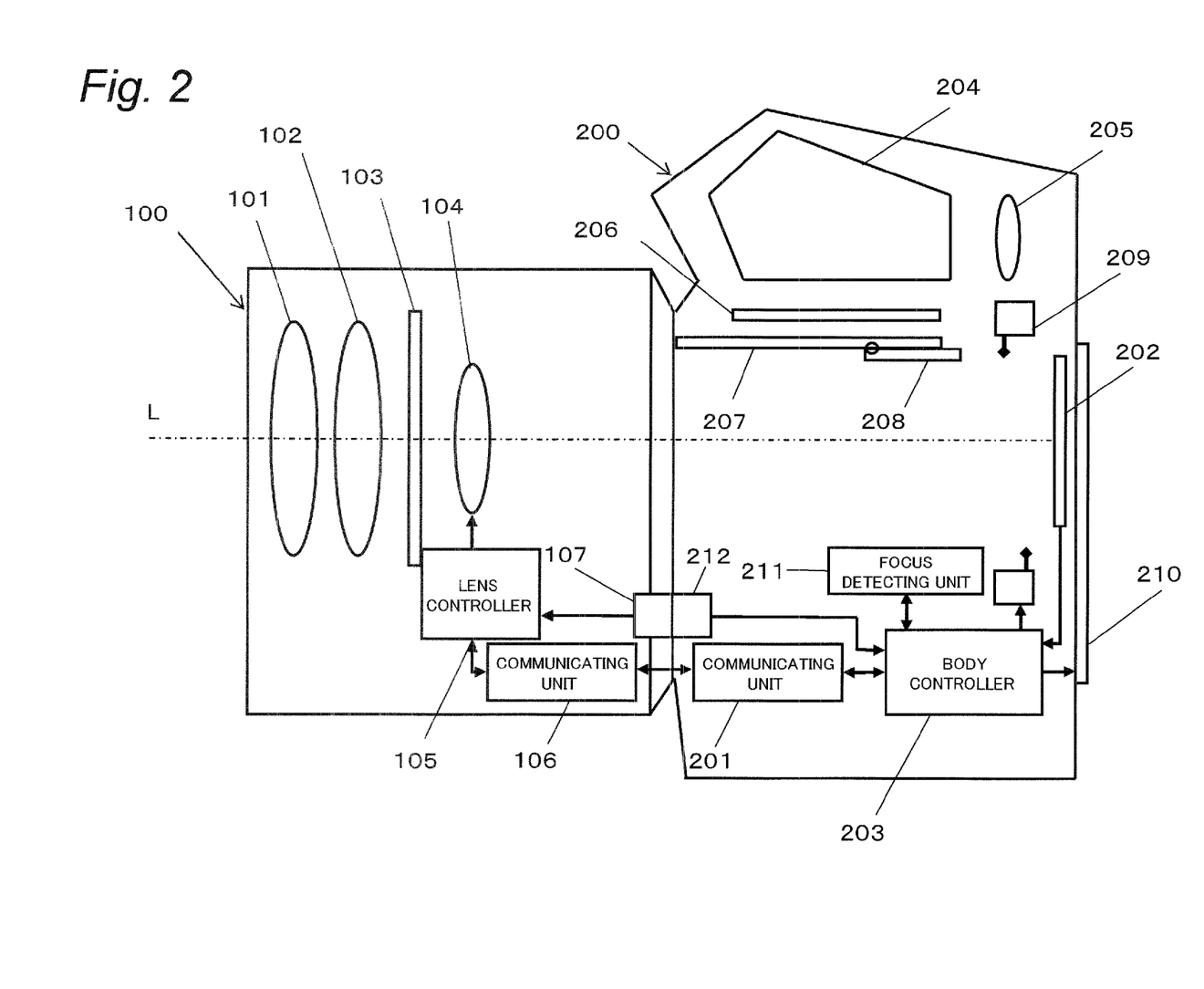
FIG. 2 is a configuration diagram of the imaging apparatus system in the embodiments in a live view mode.

FIGS. 1 and 2 are configuration diagrams of an imaging system in a first embodiment. FIGS. 1 and 2 respectively show configurations of the imaging system in a finder view mode and a live view mode (each mode will be described later). The imaging system is configured by an interchangeable lens 100 and a camera body 200. The interchangeable lens 100 is mountable to a predetermined location of the camera body 200.

1-1. Camera Body

The camera body 200 has a second communicating unit 201, an imaging device 202, a body controller 203, a pentaprism 204, an eyepiece lens 205, a focusing glass 206, a main mirror 207, a submirror 208, a shutter 209, liquid crystal unit (hereinafter, referred to as the "LCD") 210 for displaying an image, a focus detecting unit 211, and a second terminal 212.

The body controller 203 is an LSI which integrally includes a microcomputer, a control circuit that controls each unit in the camera body 200, and a signal processing circuit that performs various signal processing. The body controller 203 controls various sequences in the camera body 200. The body controller 203 controls the operation of each unit in the camera body 200 and also outputs a reference signal to a lens controller 105 through the second communicating unit 201 and a first communicating unit 106. The body controller 203 can control the operation of the imaging device 202. The body controller 203 can convert an image signal outputted from the imaging device 202 to image data which is a digital signal and perform various signal processing such as white balance control. The body controller 203 can output the image data obtained through various signal processing to the LCD 210. The body controller 203 can control driving of mechanisms such as the shutter 209, the main mirror 207, and the submirror 208.

Also, the body controller 203 outputs a reference signal to the lens controller 105 through the second terminal 212 and a first terminal 107. The reference signal is outputted to the lens controller 105 in a predetermined cycle. The body controller 203 can switch the cycle of the reference signal to another if necessary. For example, when sufficient exposure time for the imaging device 202 needs to be ensured, like when shooting in a dark place, the cycle of the reference signal may be made longer. When a high-speed focus operation needs to be performed, the cycle of the reference signal may be shortened, since a focusing speed increases by processing larger numbers of image data in a short time (in the case of focus detection in a contrast detection method which will be described later). When a process for detecting a human face from image data is performed, the cycle of the reference signal may be shortened, since detection accuracy increases by processing larger numbers of image data in a short time. Before the body controller 203 switches the cycle of the reference signal to another, the body controller 203 sends information announcing switching of the cycle of the reference signal to another, to the lens controller 105 through the second communicating unit 201 and the first communicating unit 106. When the body controller 203 obtains information indicating that the cycle of the reference signal is ready to be switched to another, from the lens controller 105 through the first communicating unit 106 and the second communicating unit 201, the body controller 203 switches the cycle of the reference signal to another.

Note that although the body controller 203 is an LSI in which integrally includes a microcomputer, a control circuit that controls each unit in the camera body 200, and a signal processing circuit that performs various signal processing, the body controller 203 may be configured by a plurality of LSIs. The camera body 200 has a release button used by a user to instruct a shooting operation, a storage unit that stores image data obtained by a shooting operation, and the like, but they are omitted in FIGS. 1 and 2. The body controller 203 outputs a reference signal to the lens controller 105 through the second terminal 212 and the first terminal 107 but may output a reference signal to the lens controller 105 through the second communicating unit 201 and the first communicating unit 106. The reference signal may be a vertical synchronizing signal for the imaging device 202 or may be a signal obtained by delaying the vertical synchronizing signal for the imaging device 202. Alternatively, independently of the vertical synchronizing signal for the imaging device 202, the reference signal may be a signal for synchronizing the operations of the camera body 200 and the interchangeable lens 100. For example, a signal obtained by dividing the frequency of a clock of the body controller 203 may be used.

The focus detecting unit 211 can capture an optical image reflected by the submirror 208 and detect a focus state of the optical image. The focus detecting unit 211 is configured by an imaging device such as a CCD image sensor and is configured, in the present embodiment, by a line sensor. Focus detection by the focus detecting unit 211 is called focus detection by a phase difference detection scheme.

The LCD 210 can display an image based on display image data generated by the body controller 203. Note that in the present embodiment the LCD 210 is configured by a liquid crystal display but may be configured by various display devices such as an organic EL display.

The imaging device 202 can convert an optical image incident thereon through the interchangeable lens 100 to an image signal and output the image signal. The imaging device 202 can be configured by a CCD image sensor or CMOS image sensor. A focus state of the optical image can be detected from the contrast of the image signal outputted from the imaging device 202. Focus detection using the contrast of an image signal outputted from the imaging device 202 is called focus detection by a contrast detection scheme.

The shutter 209 is disposed at a location facing an imaging surface of the imaging device 202 and can allow an optical image incident on the imaging device 202 from the side of the interchangeable lens 100 to pass therethrough or cut off the optical image.

The submirror 208 reflects an optical image incident thereon from the side of the interchangeable lens 100, to the side of the focus detecting unit 211. The submirror 208 can take a state of being located on an optical axis L, as shown in FIG. 1, and a state of being evacuated from the optical axis L, as shown in FIG. 2.

The main mirror 207 is configured by a half-silvered mirror. The main mirror 207 can reflect an optical image incident thereon from the side of the interchangeable lens 100, to the side of the focusing glass 206 and can allow the optical image to pass therethrough to the side of the submirror 208. The main mirror 207 can take a state of being located on the optical axis L, as shown in FIG. 1, and a state of being evacuated from the optical axis L, as shown in FIG. 2.

The focusing glass 206 forms an optical image reflected by the main mirror 207. The pentaprism 204 internally reflects the optical image formed by the focusing glass 206 and guides the optical image to the side of the eyepiece lens 205. In the present embodiment, an optical finder is configured, by the focusing glass 206, the pentaprism 204, and the eyepiece lens 205. A user can visually recognize the optical image from the external side of the eyepiece lens 205.

In the present embodiment, switching between a finder view mode and a live view mode can be performed. Here, the live view mode is a mode in which an optical image incident to the interchangeable lens 100 is converted to image data within the camera body 200 and the image data can be displayed on the LCD 210. The finder view mode is a mode in which the user can visually recognize an optical image incident to the interchangeable lens 100, through the eyepiece lens 205. In the following description, the live view mode is referred to as the "LV mode" and the finder view mode is referred to as the "finder mode".

1-2. Interchangeable Lens

The interchangeable lens 100 has an objective lens 101, a zoom lens 102, a diaphragm unit 103, a focus lens 104, the lens controller 105, the first communicating unit 106, and the first terminal 107.

The lens controller 105 is an LSI in which integrally includes a microcomputer and a control circuit that controls each unit in the interchangeable lens 100. The lens controller 105 can control the zoom lens 102, the diaphragm unit 103, and the focus lens 104 based on control signals outputted from the body controller 203 through the first communicating unit 106 and the second communicating unit 201. The lens controller 105 moves the focus lens 104 in a direction of the optical axis L based on a control signal outputted from the body controller 203. Also, the lens controller 105 controls a wobbling operation of the focus lens 104 based on a reference signal and information indicating a phase of the reference signal which are sent from the body controller 203.

Also, when the lens controller 105 receives information (announcement information) preliminarily announcing switching of the cycle of the reference signal to another which is sent from the body controller 203 through the second communicating unit 201 and the first communicating unit 106, the lens controller 105 performs a change process (initialization of various internal variables for a cycle of the reference signal having been used up to now, setting of various internal variables for a new cycle of the reference signal, and so on), a process of stopping the drive of the focus lens 104, a process of waiting for the drive of the focus lens 104 to stop, and a process of confirming the stop of the focus lens 104 and thereafter sends information indicating that the cycle of the reference signal is ready to be switched to another, to the body controller 203 through the first communicating unit 106 and the second communicating unit 201.

The lens controller 105 controls not only the drive of the focus lens 104 but also the drive of the diaphragm unit 103 and the zoom lens 102 (in the case of power zoom), and so on. These drive controls may also need to be performed in synchronization with the reference signal but in the present embodiment the control of the drive of the focus lens 104 is mainly described.

Note that although the lens controller 105 is an LSI in which a microcomputer and a control circuit that controls each unit in the interchangeable lens 100 are integrally provided, the lens controller 105 may be configured by a plurality of LSIs. The interchangeable lens 100 has a mechanism for detecting shake, a storage unit that stores information unique to the interchangeable lens 100, and the like, but they are omitted in FIGS. 1 and 2.

The focus lens 104 is disposed to be movable along the direction of the optical axis L by a driver such as a focus motor (not shown).

2. Operations

In the finder mode, the focus lens 104 is caused to move at one time based on a focus state of an optical image detected by the focus detecting unit 211 (phase difference detection method). On the other hand, in the LV mode, the focus lens 104 is caused to move gradually based on a focus state of an optical image detected from the contrast of an image signal outputted from the imaging device 202 (contrast detection method). Operations performed in the LV mode will be described below.

2-1. Contrast Detection Method

Figure 3:
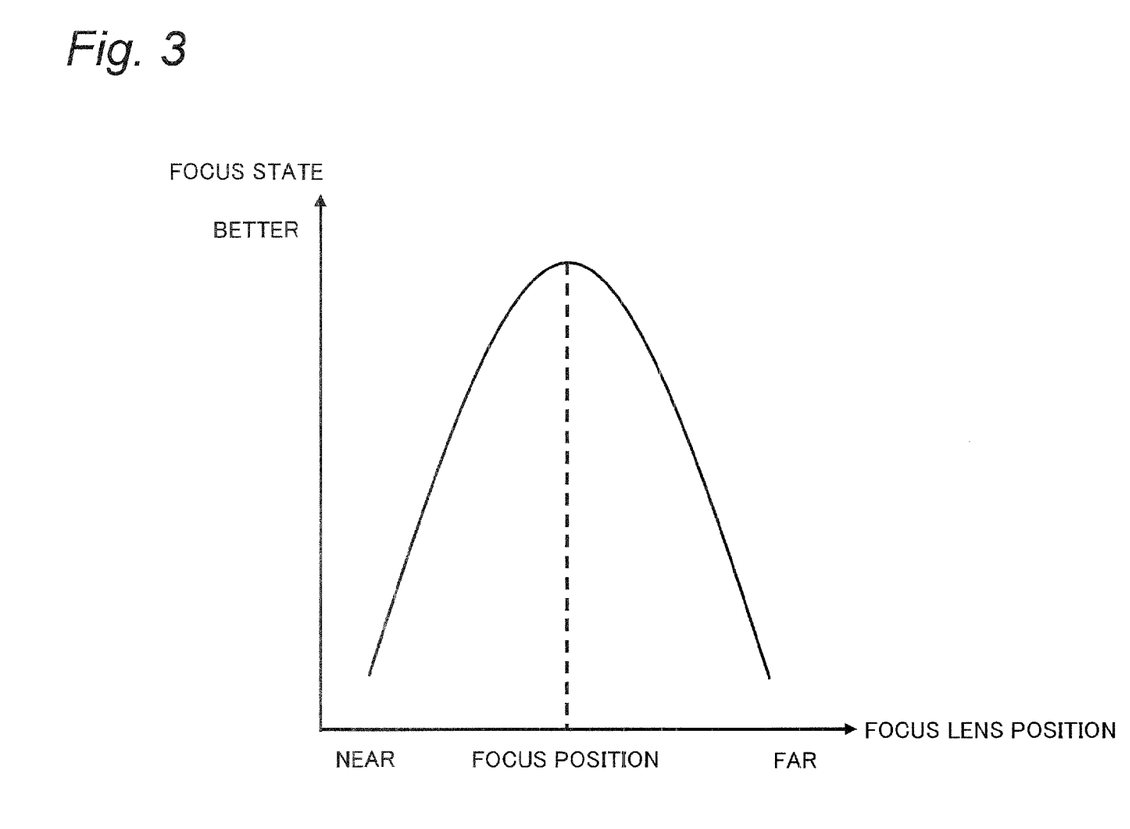
FIG. 3 is an illustrative diagram of focus detection by a contrast detection method (hill-climbing method).

FIG. 3 is an illustrative diagram of focus detection by contrast detection. A horizontal axis represents the position on the optical axis L of the focus lens 104. A vertical axis represents the focus state of an optical image detected from the contrast of an image signal outputted from the imaging device 202. As the position on the optical axis L of the focus lens 104 gets closer to the focus position, the focus state gets better. A position on the optical axis L of the focus lens 104 where the focus state reaches its peak is the focus position.

2-2. Wobbling Operation

To move the position on the optical axis L of the focus lens 104 to the focus position, the focus lens 104 is caused to minutely vibrate on the optical axis L. It is determined to which direction the focus position is relative to the current position on the optical axis L of the focus lens 104, based on a change in focus state in the lens position obtained through the minute vibration. Then, the position on the optical axis L of the focus lens 104 is caused to move gradually to the focus position. Such an operation is called a "wobbling operation".

Figure 4A:
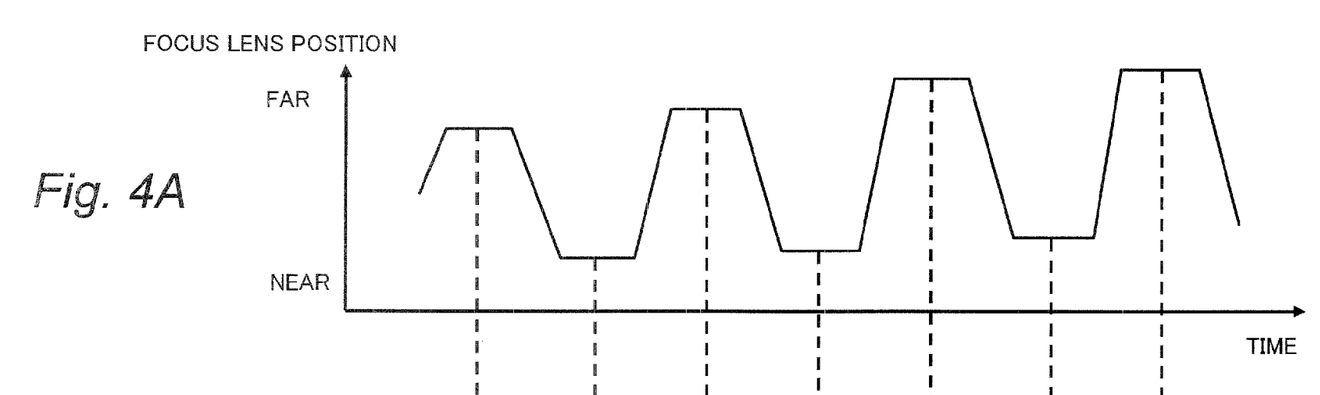
FIGS. 4A and 4B are diagrams showing changes of the position on an optical axis L of a focus lens during a wobbling operation.
Figure 4B:
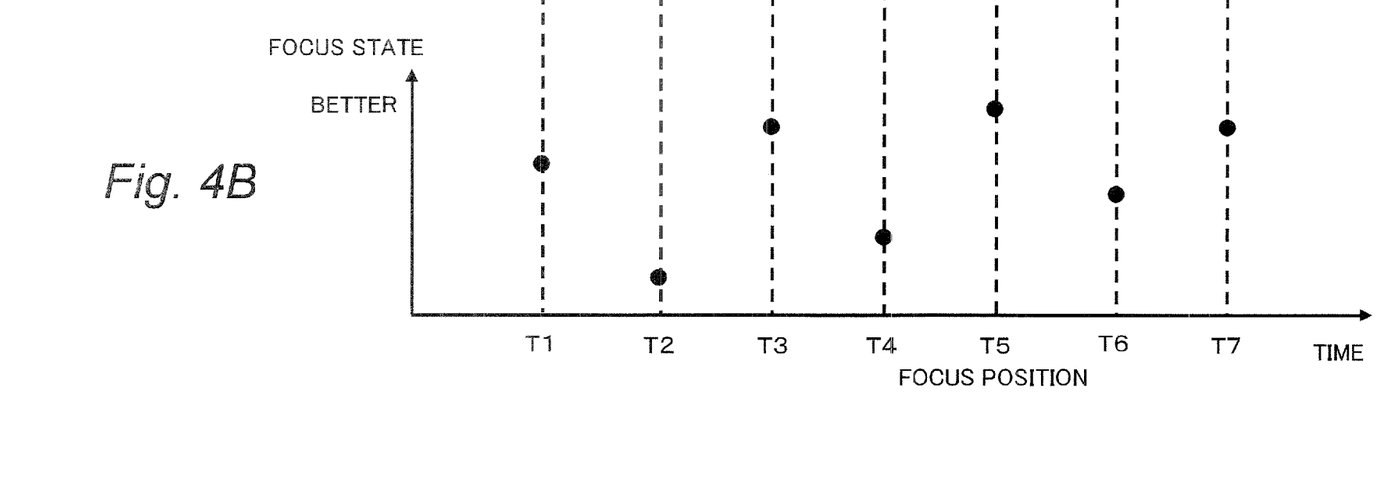

FIGS. 4A and 4B are diagrams showing changes in the position on the optical axis L of the focus lens 104 during a wobbling operation. FIG. 4A shows a position on the optical axis L of the focus lens 104 subjected to minute vibration during a wobbling operation and FIG. 4B shows a focus state at times T1 to T7.

At time T1, the focus lens 104 is caused to move more to the far side than the current position thereof. At time T2, the focus lens 104 is caused to move to the near side. The focus state when the focus lens 104 is located on the far side at time T1 is better than that when the focus lens 104 is located on the near side at time T2. Hence, it can be found that the focus position is on the far side than the current position of the focus lens 104. Thus, at time T3, the focus lens 104 is caused to move further to the far side. Since the focus state when the focus lens 104 is located on the far side at time T3 is better than that when the focus lens 104 is located on the far side at time T1, it is estimated that the focus position is further on the far side than the current position of the focus lens 104. Thus, at time T5, the focus lens 104 is caused to move further to the far side. Since the focus state when the focus lens 104 is located on the far side at time T5 is better than that when the focus lens 104 is located on the far side at time T3, it is estimated that the focus position is further on the far side than the current position of the focus lens 104. Thus, at time T7, the focus lens 104 is caused to move further to the far side. However, since the focus state when the focus lens 104 is located on the far at time T5 is better than that when the focus lens 104 is located on the far side at time T7, it can be found that the focus position is on the near side than the current position of the focus lens 104. By such operations, it can be found that the focus position is a position at which the focus lens 104 is located at time T5.

Note that although in FIG. 4 the focus lens 104 performs trapezoidal wave drive, the focus lens 104 may perform sine wave drive.

2-3. Operation Sequence

Figure 5:
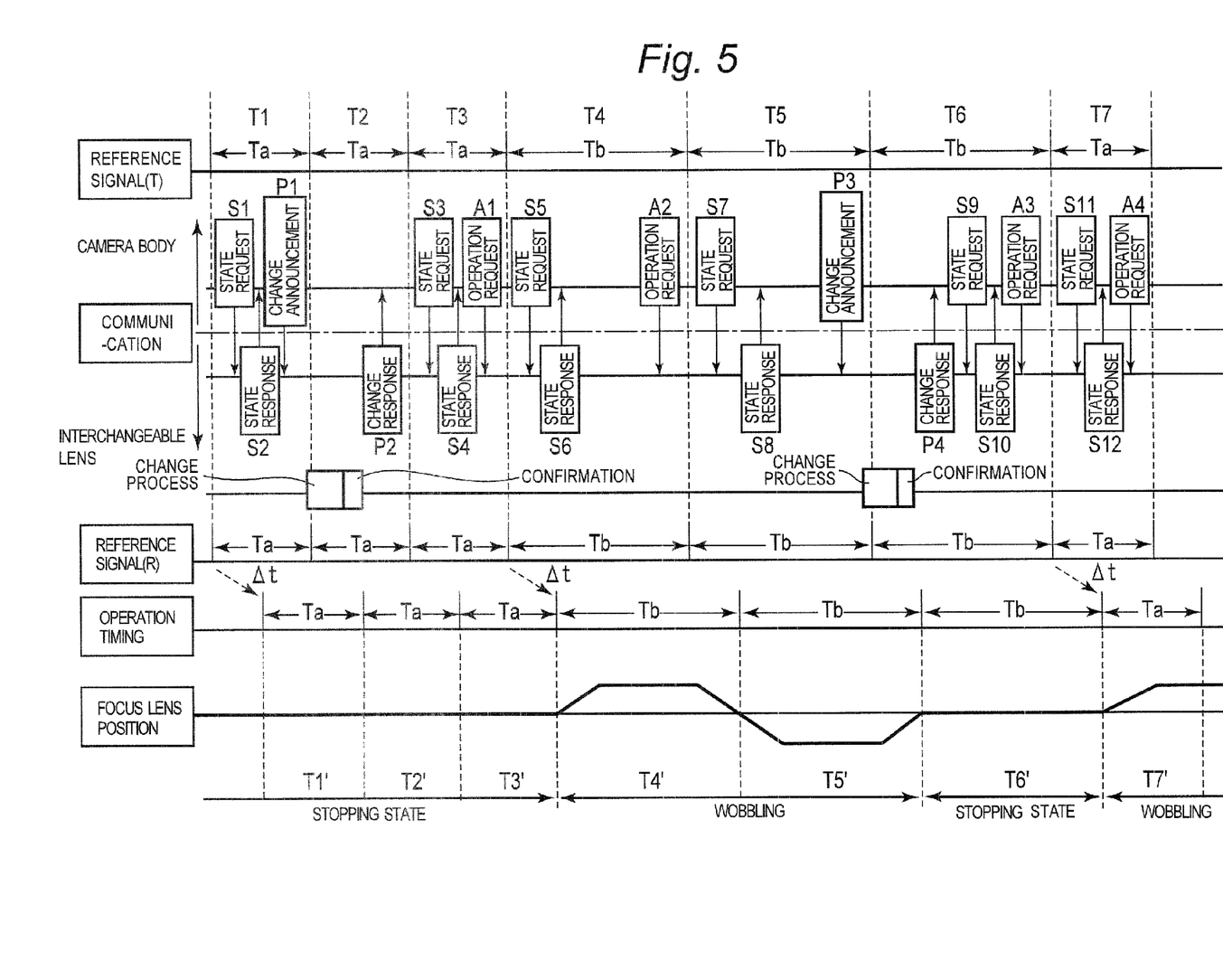
FIG. 5 is a diagram showing a sequence of switching a cycle of a reference signal to another in a first embodiment.

With reference to FIG. 5, an operation of switching a reference signal of the imaging system to another in the present embodiment will be described. FIG. 5 is a diagram showing a sequence of switching the cycle of a reference signal to another. A horizontal axis is a time axis and represents a lapse of time from left to right. A portion above a dash-dotted line shows operations performed in the camera body 200. A portion below the dash-dotted line shows operations performed in the interchangeable lens 100, a reference signal, a control signal, and the position of the focus lens 104. The focus lens 104 stops during periods T1 to T3, performs a wobbling operation in periods T4 and T5, stops again in period T6, and then restarts a wobbling operation in and after period T7. The cycle of the reference signal is Ta during periods T1 to T3 and T7 and later, and it is Tb which is longer than the Ta during periods T4 to T6. Periods T1' to T7' respectively correspond to periods T1 to T7.

In FIG. 5, the "reference signal" is a signal serving as a reference for start timing of wobbling operation and is outputted from the body controller 203 of the camera body 200 to the lens controller 105 of the interchangeable lens 100. The "communication" indicates communication data (commands, responses, and so on.) to be sent and received between the second communicating unit 201 of the camera body 200 and the first communicating unit 106 of the interchangeable lens 100. When the lens controller 105 of the interchangeable lens 100 receives a reference signal from the body controller 203, the lens controller 105 outputs a control signal after a lapse of a predetermined delay time Δt. The "operation timing" indicates wobbling operation start timing. Operation timing is provided as timing delayed by a predetermined period of time from the reference signal. The "focus lens position" indicates a position of the focus lens 104 obtained when a wobbling operation is performed. The lens controller 105 of the interchangeable lens 100 controls the driving of an optical system configured by the zoom lens 102, the diaphragm unit 103, the focus lens 104, and so on, in synchronization with the reference signal received from the camera body 200 and at timing delayed from the reference signal.

The camera body 200 periodically inquires the interchangeable lens 100 about a state (state requests S1, S3, S5, . . . , S11). In response to the state request from the camera body 200, the interchangeable lens 100 provides, information about the positions of the zoom lens 102 and the focus lens 104, as a response, the aperture value of the diaphragm unit 103, and so on (state responses S2, S4, S6, . . . , S12).

In period T1, the camera body 200 sends information ("change announcement" P1) preliminarily announcing switching of the cycle of the reference signal to another, to the interchangeable lens 100. In response to the change announcement P1 from the camera body 200, the interchangeable lens 100 performs initialization of various internal variables for a cycle of the reference signal having been used up to now, setting of various internal variables for a new cycle of the reference signal, and so on (change process). When the interchangeable lens 100 has confirmed that these operations have been completed (confirmation), the interchangeable lens 100 sends information ("change response" P2) indicating that the cycle of the reference signal is ready to be switched, to the camera body 200. When the camera body 200 receives the change response P2 from the interchangeable lens 100, the camera body 200 can recognize that changing of the cycle of the reference signal is ready in the interchangeable lens 100. The camera body 200 does not make a state request to the interchangeable lens 100 during a period from when sending the change announcement P1 until receiving the change response P2.

In order to cause the focus lens 104 to perform a wobbling operation using a new cycle Tb from period T4, the camera body 200 sends, in period T3 previous thereto, information ("operation request" A1) instructing details of a wobbling operation, to the interchangeable lens 100. Note that although in the imaging apparatus system in the present embodiment the interchangeable lens 100 does not send a response to the operation request from the camera body 200, the interchangeable lens 100 may send a response indicating acceptance of the operation request from the camera body 200.

In period T4, the camera body 200 switches, the cycle of the reference signal from a cycle Ta having been used up to now to a longer cycle Tb. The interchangeable lens 100 causes the focus lens 104 to start a wobbling operation using the new cycle Tb from period T4', based on the information instructing about details of a wobbling operation obtained from the operation request A1.

In period T4, in order to cause the focus lens 104 to continuously perform a wobbling operation also in next period T5, the camera body 200 sends information ("operation request" A2) instructing details of a wobbling operation, to the interchangeable lens 100. The interchangeable lens 100 performs a wobbling operation of the focus lens 104 in period T5, too, based on the details of a wobbling operation obtained from the operation request A2.

In period T5, the camera body 200 sends information ("change announcement" P3) preliminarily announcing switching of the cycle of the reference signal to another, to the interchangeable lens 100. When the interchangeable lens 100 receives the change announcement P3 from the camera body 200, the interchangeable lens 100 performs initialization of various internal variables for a cycle of the reference signal having been used up to now, setting of various internal variables for a new cycle of the reference signal, stopping of the driving of the focus lens 104, and so on ("change process"). When the interchangeable lens 100 has confirmed that these operations have been completed ("confirmation"), the interchangeable lens 100 sends information ("change response" P4) indicating that switching the cycle of the reference signal to another is ready, to the camera body 200. When the camera body 200 receives the change response P4 from the interchangeable lens 100, the camera body 200 can recognize that changing of the cycle of the reference signal is ready in the interchangeable lens 100. The camera body 200 does not make a state request to the interchangeable lens 100 during a period from when sending the change announcement P3 until receiving the change response P4.

In period T6, in order to cause the focus lens 104 to perform a wobbling operation using a new cycle Ta from next period T7, the camera body 200 sends information ("operation request" A3) instructing about details of a wobbling operation, to the interchangeable lens 100. Note that since period T6 is long in length (cycle Tb), during the period both processes of receiving the change response P4 and sending a state request S9 and the operation request A3 can be performed. On the other hand, since periods T2 and T3 are short in length (cycle Ta), receiving the change response P2 and sending the state request S3 and the operation request A1 are performed in different periods.

From period T7, the camera body 200 switches, the cycle of the reference signal from Tb to Ta which is shorter than Tb. The interchangeable lens 100 performs a wobbling operation of the focus lens 104 using the new cycle Ta from period T7', according to the operation request A3.

3. Conclusion

According to the imaging system in the present embodiment, upon switching the cycle of a reference signal to another, the camera body 200 sends information (change announcement) preliminarily announcing switching of the cycle of the reference signal to another, to the interchangeable lens 100. When the interchangeable lens 100 receives the change announcement, the interchangeable lens 100 performs preparation for switching the cycle of the reference signal to another (change process). In this manner, the cycle of the reference signal is prevented from being suddenly switched to another while the interchangeable lens 100 is driving the optical system, for example, and preparation for switching the cycle of the reference signal to another is favorably performed. Accordingly, trouble in the control of the interchangeable lens 100 associated with a change in the cycle of the reference signal can be prevented.

When the lens controller 105 has completed the preparation for switching the cycle of the reference signal to another, the lens controller 105 sends information (change response) indicating that switching the cycle of the reference signal to another is ready, to the body controller 203 through the first communicating unit 106 and the second communicating unit 201. When the body controller 203 receives the change response, the body controller 203 switches the cycle of the reference signal to another. Hence, the cycle of the reference signal is reliably prevented from being switched to another before preparation for switching the cycle of the reference signal to another has been completed. Accordingly, trouble in the control of the interchangeable lens 100 associated with a change in the cycle of the reference signal can be reliably prevented.

Second Embodiment

Figure 6:
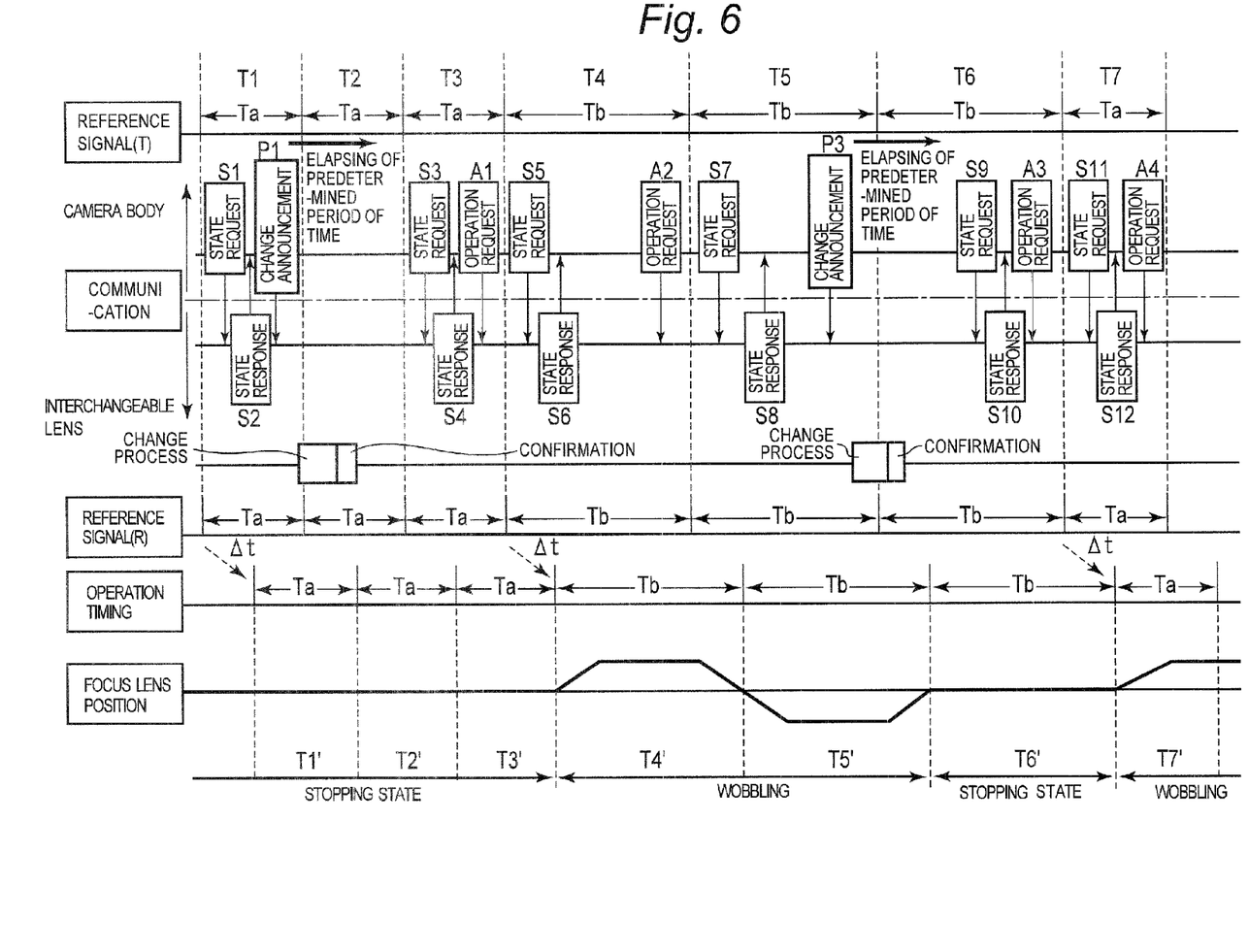
FIG. 6 is a diagram showing a sequence of switching a cycle of a reference signal to another in a second embodiment.

FIG. 6 is a diagram showing a sequence of switching the cycle of a reference signal in a second embodiment. In the present embodiment, the body controller 203 of the camera body 200 can switch the cycle of a reference signal when a predetermined period of time elapses after sending information (change announcement) preliminarily announcing switching of the cycle of the reference signal, to the lens controller 105. When the interchangeable lens 100 receives the change announcement from the camera body 200, the interchangeable lens 100 performs a change process and confirmation as with the first embodiment but does not send thereafter a change response to the camera body 200. Specifically, when the predetermined period of time elapses after the body controller 203 of the camera body 200 sends a change announcement to the lens controller 105, the body controller 203 performs control assuming that changing of the cycle of the reference signal is ready in the interchangeable lens 100.

The predetermined period of time is set to longer time than the time required for at least a change process and confirmation. Note that the predetermined period of time may be set to a value further taking into account the type or capability of the interchangeable lens. For example, the predetermined period of time may be set taking into account the drive capability of an actuator for the focus lens or the zoom lens, the focal length of the interchangeable lens, and so on. When the predetermined period of time thus varies between interchangeable lenses, the configuration may be such that, for example, information about the predetermined period of time is stored in the lens controller 105 of the interchangeable lens 100 or a storage unit provided in the interchangeable lens 100, and when the interchangeable lens 100 is attached to the camera body 200, the information about the predetermined period of time is sent to the body controller 203 of the camera body from the lens controller 105 through the communicating units. Other configurations are the same as those in the first embodiment. The information about the predetermined period of time may be a fixed value taking into account the type or capability of the interchangeable lens or may be a coefficient for the cycle of a reference signal outputted to the interchangeable lens from the camera body. The latter is effective for when the time required for the interchangeable lens to perform a change process and confirmation is proportional to the cycle of the reference signal.

As described above, according to the second embodiment, when a predetermined period of time elapses after the body controller 203 of the camera body 200 sends a change announcement to the lens controller 105, the body controller 203 performs the same process as that performed when a change response is received in the first embodiment. As such, since the body controller 203 can switch the cycle of a reference signal without waiting for a change response from the interchangeable lens 100, the control of the lens controller 105 is facilitated. In addition, the lens controller 105 of the interchangeable lens 100 does not need to send a change response to the body controller 203 of the camera body 200. That is, a load on the lens controller 105 can be reduced.

Note that the condition of switching the cycle of a reference signal may be a lapse of a predetermined number of frames or predetermined cycle, instead of a predetermined period of time.

Other Embodiments

Although in the above-described embodiments a reference signal is sent to the interchangeable lens 100 from the camera body 200 through the first terminal 107 and the second terminal 212, the configuration may be such that a reference signal is sent to the interchangeable lens 100 from the camera body 200 through the first communicating unit 106 and the second communicating unit 201. That is, a communication unit that performs communication between the camera body 200 and the interchangeable lens 100 may be configured by the first and second terminals 107 and 212 and the first and second communicating units 106 and 201 or may be configured only by the first and second communicating units 106 and 201.

The reference signal may be a vertical synchronizing signal for the imaging device 202 or may be a signal obtained by delaying the vertical synchronizing signal for the imaging device 202. Alternatively, independently of the vertical synchronizing signal for the imaging device 202, the reference signal may be a signal for synchronizing the operations of the camera body 200 and the interchangeable lens 100. For example, a signal obtained by dividing the frequency of a clock of the body controller 203 may be used.

In the above-described embodiments, a configuration is described that includes the main mirror 207 and the submirror 208 and has a finder mode that allows a user to visually recognize an optical image incident on the interchangeable lens 100, through the eyepiece lens 205. However, as is also clear from the description of the embodiments, the embodiments can also be applied to an imaging system having only an LV mode. That is, the embodiments can also be applied to an imaging system that does not include a main mirror 207, a submirror 208, a pentaprism 204, an eyepiece lens 205, a focusing glass 206, and a focus detecting unit 211 and that performs shooting by a photographer visually recognizing a subject displayed on an LCD 210.

INDUSTRIAL APPLICABILITY

According to an imaging system in the present embodiments, an imaging apparatus system and a camera body and an interchangeable lens that can prevent trouble in the control of the interchangeable lens associated with a change in the cycle of a reference signal in an imaging system configured by an interchangeable lens and a camera body can be provided and are useful as an interchangeable lens type single-lens reflex digital camera system and a body and an interchangeable lens of the digital camera.

Although the embodiment has been described with reference to specific embodiments, many other variants, modifications, and other uses are obvious to those skilled in the art. Therefore, the present embodiment is not limited to the specific disclosure made herein and can only be limited by the appended claims. Note that the present application relates to Japanese Patent Application No. 2008-168358 (filed Jun. 27, 2008) and U.S. Provisional Patent Application No. 61/053,815 (filed May 16, 2008), the contents of which are incorporated herein by reference.

DESCRIPTION OF THE REFERENCE NUMERALS

100: INTERCHANGEABLE LENS
101: OBJECTIVE TENS
102: ZOOM LENS
103: DIAPHRAGM UNIT
104: FOCUS LENS
105: LENS CONTROLLER
106: FIRST COMMUNICATING UNIT
107: FIRST TERMINAL
200: CAMERA BODY
201: SECOND COMMUNICATING UNIT
202: IMAGING DEVICE
203: BODY CONTROLLER
204: PENTAPRISM
205: EYEPIECE LENS
206: FOCUSING GLASS
207: MAIN MIRROR
208: SUBMIRROR
209: SHUTTER
210: IMAGE DISPLAY UNIT
211: FOCUS DETECTING UNIT
212: SECOND TERMINAL

The invention claimed is:

1. An imaging apparatus system comprising an interchangeable lens and a camera body,
the interchangeable lens comprising:
an optical system configured to generate an optical image of a subject;
a first communication unit; and
a lens controller configured to control driving of the optical system in synchronization with a reference signal received through the first communication unit,
the camera body comprising:
a second communication unit that can communicate with the first communication unit; and
a body controller configured to send the reference signal to the lens controller through the second communication unit and the first communication unit,
wherein the body controller, before switching a cycle of the reference signal to another, sends announcement information preliminarily announcing switching of the cycle of the reference signal to another, to the lens controller through the second communication unit and the first communication unit, and
the lens controller, when receiving the announcement information, performs a preparation operation for switching the cycle of the reference signal, and when the preparation operation for switching the cycle of the reference signal is completed, the lens controller sends information indicating that switching the cycle of the reference signal is ready, to the body controller through the first communication unit and the second communication unit, and
the body controller, after receiving the information indicating that switching the cycle of the reference signal is ready, switches the cycle of the reference signal to another.

2. The imaging apparatus system according to claim 1, wherein
the camera body further includes an imaging device that converts the optical image generated by the optical system to an electrical signal,
and the reference signal is a vertical synchronizing signal for the imaging device.

3. The imaging apparatus system according to claim 1, wherein
the camera body further includes an imaging device that converts the optical image generated by the optical system to an electrical signal,
and the reference signal is a signal obtained by delaying a vertical synchronizing signal for the imaging device.

4. An imaging apparatus system comprising an interchangeable lens and a camera body,
the interchangeable lens comprising:
an optical system configured to generate an optical image of a subject;
a first communication unit; and
a lens controller configured to control driving of the optical system in synchronization with a reference signal received through the first communication unit,
the camera body comprising:
a second communication unit that can communicate with the first communication unit; and
a body controller configured to send the reference signal to the lens controller through the second communication unit and the first communication unit,
wherein the body controller, before switching a cycle of the reference signal to another, sends announcement information preliminarily announcing switching of the cycle of the reference signal to another, to the lens controller through the second communication unit and the first communication unit, and
the lens controller, when receiving the announcement information, performs a preparation operation for switching the cycle of the reference signal to another, and sends information about time required to switch the cycle of the reference signal to another, to the body controller through the first communication unit and the second communication unit, and
the body controller switches the cycle of the reference signal to another based on the information about time required to switch the cycle of the reference signal which is received from the lens controller.

5. The imaging apparatus system according to claim 4, wherein
the camera body further includes an imaging device that converts the optical image generated by the optical system to an electrical signal,
and the reference signal is a vertical synchronizing signal for the imaging device.

6. The imaging apparatus system according to claim 4, wherein
the camera body further includes an imaging device that converts the optical image generated by the optical system to an electrical signal,
and the reference signal is a signal obtained by delaying a vertical synchronizing signal for the imaging device.

7. An imaging apparatus system comprising an interchangeable lens and a camera body,
the interchangeable lens comprising:
an optical system including a focus lens that changes a focus state of an image of a subject;
a first communication unit; and
a lens controller configured to control driving of the focus lens to move along the optical axis in a driving cycle based on a cycle of a reference signal received through the first communication unit,
the camera body comprising:
a second communication unit that can communicate with the first communication unit; and
a body controller configured to send the reference signal to the lens controller through the second communication unit and the first communication unit,
wherein the body controller, before switching a cycle of the reference signal to another, sends announcement information preliminarily announcing switching of the cycle of the reference signal to another, to the lens controller through the second communication unit and the first communication unit, and
the lens controller, when receiving the announcement information, performs a preparation operation for switching the cycle of the reference signal.

8. The imaging apparatus system according to claim 7, wherein
when the preparation operation for switching the cycle of the reference signal is completed, the lens controller sends information indicating that switching the cycle of the reference signal is ready, to the body controller through the first communication unit and the second communication unit, and
the body controller, after receiving the information indicating that switching the cycle of the reference signal is ready, switches the cycle of the reference signal to another.

9. The imaging apparatus system according to claim 7, wherein
the body controller switches the cycle of the reference signal to another after any one of a predetermined period of time, a predetermined number of frames, and a predetermined cycle elapses after sending the information preliminarily announcing switching of the cycle of the reference signal, to the lens controller.

10. The imaging apparatus system according to claim 7, wherein
the lens controller sends information about time required to switch the cycle of the reference signal to another, to the body controller through the first communication unit and the second communication unit, and
the body controller switches the cycle of the reference signal to another based on the information about time required to switch the cycle of the reference signal which is received from the lens controller.

11. The imaging apparatus system according to claim 7, wherein
the camera body further includes an imaging device that converts the optical image generated by the optical system to an electrical signal,
and the reference signal is a vertical synchronizing signal for the imaging device.

12. The imaging apparatus system according to claim 7, wherein
the camera body further includes an imaging device that converts the optical image generated by the optical system to an electrical signal,
and the reference signal is a signal obtained by delaying a vertical synchronizing signal for the imaging device.

13. A camera body which can be mounted with an interchangeable lens having an optical system and a lens controller configured to control driving of the optical system in synchronization with a received reference signal, the camera body comprising:
a communication unit; and
a body controller configured to send the reference signal to the interchangeable lens through the communication unit, wherein
the body controller, before switching a cycle of the reference signal to another, sends announcement information preliminarily announcing switching of a cycle of the reference signal to another, to the interchangeable lens through the communication unit,
the lens controller, when receiving the announcement information, performs a preparation operation for switching the cycle of the reference signal, and when the preparation operation for switching the cycle of the reference signal is completed, the lens controller sends information indicating that switching the cycle of the reference signal is ready, to the body controller, and
the body controller, after receiving the information indicating that switching the cycle of the reference signal is ready, switches the cycle of the reference signal to another.

14. A camera body which can be mounted with an interchangeable lens having an optical system and a lens controller configured to control driving of the optical system in synchronization with a received reference signal, the camera body comprising:
a communication unit; and
a body controller configured to send the reference signal to the interchangeable lens through the communication unit, wherein
the body controller, before switching a cycle of the reference signal to another, sends announcement information preliminarily announcing switching of a cycle of the reference signal to another, to the interchangeable lens through the communication unit,
the lens controller, when receiving the announcement information, performs a preparation operation for switching the cycle of the reference signal, and sends information about time required to switch the cycle of the reference signal to another, to the body controller, and
the body controller switches the cycle of the reference signal to another based on the information about time required to switch the cycle of the reference signal which is received from the lens controller.

15. A camera body which can be mounted with an interchangeable lens having an optical system including a focus lens that changes a focus state of an image of a subject, and a lens controller configured to control driving of the focus lens to move along the optical axis in a driving cycle based on a cycle of a reference signal received through the first communication unit, the camera body comprising:
a communication unit; and
a body controller configured to send the reference signal to the interchangeable lens through the communication unit, wherein
the body controller, before switching a cycle of the reference signal to another, sends announcement information preliminarily announcing switching of a cycle of the reference signal to another, to the interchangeable lens through the communication unit.

16. An interchangeable lens mountable to a camera body, comprising:
- an optical system configured to generate an optical image of a subject;
- a communication unit; and
- a lens controller configured to control driving of the optical system in synchronization with a reference signal received from the camera body through the communication unit, wherein
- the lens controller, when receiving announcement information preliminarily announcing switching of a cycle of the reference signal to another, from the camera body through the communication unit, performs preparation operation for switching the cycle of the reference signal to another, and when the preparation operation for switching the cycle of the reference signal is completed, the lens controller sends information indicating that switching the cycle of the reference signal is ready, to the body controller through the communication unit.

17. An interchangeable lens mountable to a camera body, comprising:
- an optical system configured to generate an optical image of a subject;
- a communication unit; and
- a lens controller configured to control driving of the optical system in synchronization with a reference signal received from the camera body through the communication unit, wherein
- the lens controller, when receiving announcement information preliminarily announcing switching of a cycle of the reference signal to another, from the camera body through the communication unit, performs preparation operation for switching the cycle of the reference signal to another, and sends information about time required to switch the cycle of the reference signal to another, to the body controller through the communication unit.

18. An interchangeable lens mountable to a camera body, comprising:
- an optical system including a focus lens that changes a focus state of an image of a subject;
- a communication unit; and
- a lens controller configured to control driving of the focus lens to move along the optical axis in a driving cycle based on a cycle of a reference signal received through the communication unit, wherein
- the lens controller, when receiving announcement information preliminarily announcing switching of a cycle of the reference signal to another, from the camera body through the communication unit, performs preparation operation for switching the cycle of the reference signal to another.

* * * * *